United States Patent [19]

Clegg

[11] Patent Number: 4,515,608

[45] Date of Patent: May 7, 1985

[54] MULTI-CHAMBER GAS ANCHOR

[75] Inventor: Joe D. Clegg, Houston, Tex.

[73] Assignee: Shell Oil Company, Houston, Tex.

[21] Appl. No.: 354,875

[22] Filed: Mar. 4, 1982

[51] Int. Cl.³ .......................................... B01D 19/00
[52] U.S. Cl. ...................................... 55/193; 55/202; 55/467; 166/105.5
[58] Field of Search ................. 55/186, 190, 192, 193, 55/201, 202, 467, 473; 166/105.5, 105.6

[56] References Cited

U.S. PATENT DOCUMENTS

| | | | |
|---|---|---|---|
| 244,037 | 7/1881 | Crowley | 166/105.5 X |
| 1,655,817 | 1/1928 | Marsh | 166/105.5 |
| 2,311,963 | 2/1943 | Pyle | 55/190 X |
| 2,705,543 | 4/1955 | Torres | 55/467 X |
| 2,833,222 | 5/1958 | Hansen | 55/193 X |
| 2,843,053 | 7/1958 | Carle | 166/105.5 X |
| 3,128,719 | 4/1964 | Jongbloed et al. | 166/105.5 |
| 3,336,732 | 8/1967 | Carroll | 55/201 |
| 3,352,090 | 11/1967 | Stillebroer | 55/190 X |
| 3,386,390 | 6/1968 | Fair | 166/105.5 |
| 4,241,788 | 12/1980 | Brennan | 166/105.5 |

FOREIGN PATENT DOCUMENTS 1006739 10/1965 United Kingdom ................. 55/201

OTHER PUBLICATIONS

"Get Rid of Gas Problems in Those Pumping Wells", by J. D. Clegg, Oil and Gas Journal, Apr. 29, 1963.

Primary Examiner—Robert Spitzer

[57] ABSTRACT

A gas anchor for use below a reciprocating well pump comprises a series of elongated chambers formed by radially extensive baffles for substantially blocking the space between a perforated liquid discharge tube and a perforated surrounding sleeve. The relative sizes and locations of the openings in the walls of the discharge tube and sleeve and the size of the chambers provide efficient operation and freedom from mechanical damage.

4 Claims, 1 Drawing Figure

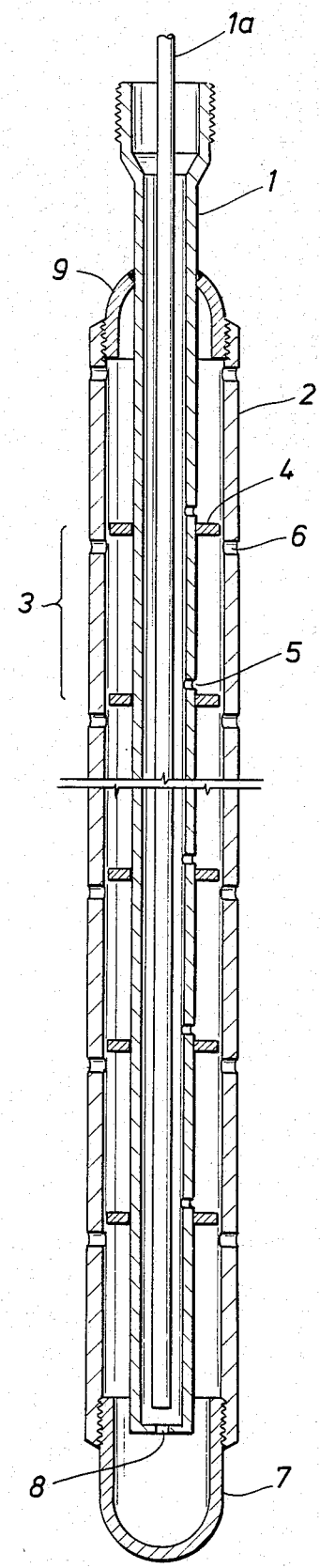

MULTI-CHAMBER GAS ANCHOR

BACKGROUND OF THE INVENTION

This invention relates to a gas anchor for use with a reciprocating well pump to separate the liquid and gaseous components of the fluid being produced from a subterranean reservoir.

Gas anchors and problems inherent in various types of gas anchors are well known. For example, cup-type gas anchors described in British Pat. No. 1,006,739, and in U.S. Pat. No. 3,352,090. Discussions of the gas interference problem and the effects of gas anchors are contained in the article entitled "Get Rid of Gas Problems in Those Pumping Wells" by J. D. Clegg, Oil and Gas Journal, Apr. 1963.

The present invention relates to an improved procedure for making a gas anchor which is similar to a cup-type anchor but is cheaper to manufacture and less subject to mechanical damage or plugging due to an accumulation of debris and thus less subject to becoming stuck within the borehole of a well or to allowing fluid circulation between the gas-liquid separation chambers of the anchor.

SUMMARY OF THE INVENTION

The present invention relates to a gas anchor for use in conjunction with a reciprocating well pump. The anchor comprises an internal liquid discharge tube for discharging fluid into the suction chamber of the pump. A concentric sleeve surrounds the discharge tube. A plurality of vertically elongated chambers are formed between the discharge tube and the sleeve by means of baffles which each extend radially from the discharge tube to near enough to the sleeve to impede the flow of fluid between the baffle and the sleeve. The volume of each chamber at least equals the volume of the suction chamber of the pump. Each chamber contains one outlet opening through the wall of the discharge tube near the bottom of the chamber and also contains at least one inlet through the wall of the sleeve at a higher location. The outlet openings are relatively small but are large enough to resist plugging by any solids which may be entrained in the produced fluid. Each chamber contains from 1 to about 10 inlet openings which are large enough so that the resistance to the inflow of fluid into the chamber is significantly less than the resistance to the outflow of fluid from the chamber.

DESCRIPTION OF THE DRAWING

The drawing is a schematic cross-sectional illustration of the present gas anchor.

DESCRIPTION OF THE PREFERRED EMBODIMENT

A central discharge tube 1 is provided with threads for connecting it to a reciprocating well pump (not shown) and/or to a production tube string. In a particularly preferred embodiment a stinger 1a is directly connected to the pump intake and extended through the discharge tube to the lower end of the lowermost one of a series of chambers. The discharge tube 1 is surrounded by a perforated sleeve 2 and the space between the tube and sleeve is divided into vertically elongated chambers, such as chamber 3, by means of the baffles 4. The baffles are fluid-tightly connected around the exterior of the discharge tube 1 and extended radially outward to locations close enough to the interior of the sleeve 2 to impede the flow of fluid between the baffles and the sleeve.

The volume of each chamber 3 is arranged to be at least about equal to, but not significantly greater than, the volume of the suction chamber of the pump. Each of the chambers contains an outlet opening 5, through the wall of the discharge tube 1 of a location near the bottom of the chamber, and at least one inlet opening 6, through the wall of the sleeve 2 at a location near the top of the chamber. Each outlet opening is relatively small but is large enough to resist plugging by solids which are apt to be entrained in the produced fluid. Each chamber preferably contains only one relatively small outlet opening and from 1 to about 10 inlet openings, with the number and/or size of the inlet openings arranged so that resistance to the inflow of fluid into the chamber is significantly less than the resistance to the outflow of fluid from the chamber.

As shown, the bottom of the lowest chamber is preferably formed by a tube closure, such as a bull plug 7, connected by threads to the bottom of the sleeve 2. The outlet to the lowermost chamber can advantageously be an opening, such as opening 8, in a bottom closure of the discharge tube 1. Similarly, the top of the uppermost chamber is preferably formed by a portion of pipe 9 which is fluid-tightly welded to the discharge tube and threadably connected to the sleeve 2.

In a preferred embodiment, the sizes and locations of the components of the present type gas anchor are preferably interrelated, as exemplified by the following: Where the pump flow rate will be less than about 100 barrels per day and the well is cased with a 5½-inch casing, the discharge tube 1 can be composed of a 2⅜ths-inch tubing string such as an EUE tubing and preferably contains a stinger 1a comprising a ¾ths-inch nominal tubing. The perforated sleeve 2 comprises a 4-inch outer diameter tubing string (such as a 9.5 lb. per foot tubing) arranged so that there is approximately 2 feet between the connections of the discharge tube to the production string and the surrounding sleeve. The sleeve preferably extends below that point for about 25 to 30 feet. This provides a relationship between the volumes of the chambers 3 and the suction chamber of a typical sucker rod pump such that the gas anchor can contain about 12 of the chambers. Each chamber preferably contains only one 3/16ths-inch outlet opening 5 through the wall of the discharge tube 1 and, about 4 per chamber of ½-inch inlet holes 6 through the wall of the sleeve 2. The baffles 4, which separate the chambers, are preferably about ½-inch thick and extend radially outward from the discharge tube 1 to within a distance of about 0.003 inches from the wall of the sleeve 2.

As known to those skilled in the art, such a gas anchor is preferably installed within the well casing below the pump and above the perforated interval through which fluid is produced from a subterranean reservoir.

During the lifting stroke of the pump, liquid is drawn upward into the suction chamber of the pump through the stinger 1a, into the stinger through the liquid discharge tube 1 and into that tube 1 through the chamber outlets 5. The fluid produced from the reservoir, which usually contains varying amounts of gas, flows into the chambers 3 through the inlets 6 during the lifting stroke of the pump. Within the chambers, the direction of flow is downward and this tends to separate the gas bubbles from the liquid, so that the liquid becomes segregated below the gas.

The downflow velocity of the liquid is kept low due to the number and design of the gas-liquid separation chambers. The downflow velocity of the liquid should be less than the rising velocity of the gas bubbles. The lower the downflow velocity of the fluid, the more efficient the gas anchor becomes, as indicated by the following equation:

$$\text{Gas Anchor Efficiency (percent)} = \frac{100}{1 + c\, p^{\frac{2}{3}} v^{\frac{1}{2}}}$$

where:
c = Constant
p = pressure at inlet to the gas anchor
v = downward velocity of the liquid in the gas anchor chamber.

The gas entering the pump is proportional to the square root of the downward velocity of the fluid and the $\frac{2}{3}$ power of the inlet pressure.

During the return stroke of the pump, the liquid remains substantially static within the discharge tube 1, stinger 1a and the chambers 3. Bubbles of gas rise through the liquid and return to the annulus around sleeve 2 through the inlet ports 6, as more fluid enters the chamber 3 through the same ports. The separated gas rises through the annulus.

As known to those skilled in the art, the sizes and locations of the pump, stinger, and gas anchor should be such that the relative sizes of the passageways for the downflow of liquid within the gas anchor are as large as practical. This causes a slow downward fluid flow velocity and tends to increase the efficiency of the gas separation, whereas little or no separation occurs when the velocity of the down-flow of fluid is high. The particular dimensions and locations of such devices will, of course, vary with variations in the viscosity and PVT characteristics of the oil being produced. In general, high viscosity oils require larger suction tubes and larger effective diameters for all of the flow passages.

What is claimed is:

1. A gas anchor for use with a reciprocating well pump for producing fluid from a subterranean reservoir, comprising;
   an internal liquid discharge tube in fluid communication with the suction chamber of the pump;
   a substantially concentric sleeve surrounding the discharge tube;
   a plurality of vertically elongated chambers formed between the discharge tube and the sleeve by means of substantially flat, radially-extensive baffles that extend from the discharge tube to close enough to the sleeve to impede the flow of fluids between the baffles and the sleeve, with each elongated chamber having a volume at least equalling that the suction chamber of the pump; and,
   in each elongated chamber, an outlet opening for liquid through the discharge tube wall near the bottom of the chamber and at least one combination fluid inlet and gas outlet opening through the sleeve wall at a location near the top of the chamber, each outlet opening for liquid being relatively small but large enough to resist plugging by solids entrained in the fluid produced from the reservoir, and the combination fluid inlet and gas outlet openings being large enough so that within each elongated chamber the fluid inflow resistance is significantly less than the outflow resistance.

2. The gas anchor of claim 1 in which each elongated chamber contains only one outlet opening having a size equivalent to a cylinder of from about $\frac{1}{8}$th to $\frac{1}{4}$th-inch in diameter.

3. The gas anchor of claim 2 in which each elongated chamber contains a plurality of inlet openings having sizes equivalent to those of cylinders of from about one-fourth to one-half inch in diameter.

4. The gas anchor of claim 1 in which each elongated chamber contains a plurality of inlet openings having sizes equivalent to those of cylinders of from about $\frac{1}{4}$ to $\frac{1}{2}$-inch in diameter.

* * * * *